United States Patent
Li

(10) Patent No.: US 9,460,863 B2
(45) Date of Patent: Oct. 4, 2016

(54) ENERGY STORAGE FROM CELLULOSE FIBER MATERIALS

(71) Applicant: University of South Carolina, Columbia, SC (US)

(72) Inventor: Xiaodong Li, Irmo, SC (US)

(73) Assignee: University of South Carolina, Columbia, SC (US)

( * ) Notice: Subject to any disclaimer, the term of this patent is extended or adjusted under 35 U.S.C. 154(b) by 560 days.

(21) Appl. No.: 13/866,103

(22) Filed: Apr. 19, 2013

(65) Prior Publication Data

US 2013/0279075 A1    Oct. 24, 2013

Related U.S. Application Data

(60) Provisional application No. 61/687,167, filed on Apr. 19, 2012.

(51) Int. Cl.
| | |
|---|---|
| *H01G 11/30* | (2013.01) |
| *H01G 11/04* | (2013.01) |
| *H01G 11/40* | (2013.01) |
| *H01G 11/46* | (2013.01) |

(52) U.S. Cl.
CPC ............ *H01G 11/30* (2013.01); *H01G 11/04* (2013.01); *H01G 11/40* (2013.01); *H01G 11/46* (2013.01); *Y02E 60/13* (2013.01); *Y10T 29/43* (2015.01)

(58) Field of Classification Search
USPC .......................................................... 361/502
See application file for complete search history.

(56) References Cited

U.S. PATENT DOCUMENTS

| | | | |
|---|---|---|---|
| 8,333,810 B1* | 12/2012 | Meyyappan ........... | H01G 11/36 29/25.03 |
| 2012/0014037 A1* | 1/2012 | Mastro ................... | H01G 11/02 361/502 |

FOREIGN PATENT DOCUMENTS

JP         2009105186 A    *   5/2009

OTHER PUBLICATIONS

Avila et al., "Smart Textiles: Tough Cotton", Nature Nanotechnology, vol. 3, No. 8, Aug. 2008, pp. 458-459.
Babel et al, "KOH Activated Carbon Fabrics as Supercapacitor Material", Journal of Physics and Chemistry of Solids vol. 65, Issues 2-3, Mar. 2004, pp. 275-280.
Bae et al., "Fiber Supercapacitors Made of Nanowire-Fiber Hybrid Structures for Wearable/Flexible Energy Storage", Angewandte Chemie—International Edition, vol. 50, Issue 7, Feb. 2011, pp. 1683-1687.
Bao et al., "Flexible $Zn_2SnO_4/MnO_2$ Core/Shell Nanocable-Carbon Microfiber Hybrid Composites for High-Performance Supercapacitor Electrodes", Nano Letters, vol. 11, No. 3, Mar. 2011, pp. 1215-1220.
Brousse et al., "Long-Term Cycling Behavior of Asymmetric Activated Carbon/$MnO_2$ Aqueous Electrochemical Supercapacitor", J. Power Sources, vol. 173, Issue 1, Nov. 2007, pp. 633-641.

(Continued)

*Primary Examiner* — Eric Thomas
(74) *Attorney, Agent, or Firm* — Dority & Manning, P.A.

(57) ABSTRACT

An asymmetric supercapacitor is described. The supercapacitor includes a first electrode, a second electrode, a thin film separator, and an electrolyte. The first electrode comprises functionalized cellulose fiber and the second electrode comprises functionalized cellulose fiber and metal oxide.

11 Claims, 7 Drawing Sheets

(56) References Cited

OTHER PUBLICATIONS

Chigane et al., "Preparation of Manganese Oxide Thin Films by Electrolysis/Chemical Deposition and Electrochromism", Journal of the Electrochemical Society, vol. 148, Issue 7, 2001, pp. D96-D101.

Cho et al., "The Intrinsic Kinetics and Heats of Reactions for Cellulose Pyrolysis and Char Formation", ChemSusChem, vol. 3, Issue 10, Oct. 2010, pp. 1162-1165.

Fan et al., "Asymmetric Supercapacitors Based on Graphene/$MnO_2$ and Activated Carbon Nanofiber Electrodes with High Power and Energy Density", Advanced Functional Materials, vol. 21, Issue 12, Jun. 2011, pp. 2366-2375.

Gregory et al., "Conductive Textiles", Synthetic Metals, vol. 28, Issues 1-2, Jan. 1989, pp. 823-835.

Gu et al., "Soft Capacitor Fibers Using Conductive Polymers for Electronic Textiles", Smart Materials and Structures, vol. 19, No. 11, 2010, pp. 115006-115019.

Higgins et al., "Infrared Spectra of Cellulose and Related Polysaccharides", Journal of Polymer Science, vol. 51, Issue 155, May 1961, pp. 59-84.

Hu et al., "Stretchable, Porous, and Conductive Energy Textiles", Nano Letters, vol. 10, No. 2, 2010, pp. 708-714.

Juan et al., "Preparation of Activated Carbon by Chemical Activation Under Vacuum", Environmental Science and Technology, vol. 43, No. 9, May 2009, pp. 3385-3390.

Khomenko et al., "Optimisation of an Asymmetric Manganese Oxide/Activated Carbon Capacitor Working at 2 V in Aqueous Medium", Journal of Power Sources, vol. 153, Issue 1, Jan. 2006, pp. 183-190.

Lang et al., "Nanoporous Metal/Oxide Hybrid Electrodes for Electrochemical Supercapacitors", Nature Nanotechnology, vol. 6, No. 4, Apr. 2011, pp. 232-236.

Lee et al., "Chemical Synthesis and Characterization of Polypyrrole Coated on Porous Membranes and its Electrochemical Stability", Synthetic Metals, vol. 113, Issues 1-2, Jun. 2000, pp. 115-119.

Leng et al., "Superoleophobic Cotton Textiles", Langmuir, vol. 25, No. 4, Feb. 2009, pp. 2456-2460.

Marchessault, "Application of Infra-Red Spectroscopy to Cellulose and Wood Polysaccharides" Pure and Applied Chemistry, vol. 5, No, 1-2, 1962, pp. 107-130.

Oh et al., "Crystalline Structure Analysis of Cellulose Treated with Sodium Hydroxide and Carbon Dioxide by Means of X-Ray Diffraction and FTIR Spectroscopy", Carbohydrate Research, vol. 340, No. 15, Oct. 2005, pp. 2376-2391.

Park et al., "Smart Textiles: Wearable Electronic Systems", MRS Bulletin, vol. 28, Issue 8, Aug. 2003, pp. 585-591.

Pasta et al., "Aqueous Supercapacitors on Conductive Cotton", Nano Research, vol. 3, 2010, pp. 452-458.

Rahal et al., "Photocatalytic Efficiency and Self-Cleaning Properties Under Visible Light of Cotton Fabrics Coated with Sensitized $TiO_2$", Applied Catalysis B: Environmental, vol. 104, Issues 3-4, May 2011, pp. 361-372.

Service, "Electronic Textiles Charge Ahead", Science, vol. 301, No. 5635, Aug. 2003, pp. 909-911.

Shishmakov et al., "Activated Carbon and Carbon-Oxide Composite Materials Derived from Powdered Cellulose", Russian Journal of Applied Chemistry, vol. 83, No. 2, Feb. 2010, pp. 307-311.

Simon et al., "Materials for Electrochemical Capacitors", Nature Materials, vol. 7, No. 11, Nov. 2008, pp. 845-854.

Tao et al., "$B_4C$-Nanowires/Carbon-Microfiber Hybrid Structures and Composites from Cotton T-Shirts", Advanced Materials, vol. 22, Issue 18, May 2010, pp. 2055-2059.

Toupin et al., "Charge Storage Mechanism of $MnO_2$ Electrode Used in Aqueous Electrochemical Capacitor", Chemistry of Materials, vol. 16, No. 16, Jul. 2004, pp. 3184-3190.

Varesano et al., "Multifunctional Cotton Fabrics", Synthetic Metals, vol. 159, Issue 11, Jun. 2009, pp. 1082-1089.

Wu et al., "High-Energy $MnO_2$ Nanowire/Graphene and Graphene Asymmetric Electrochemical Capacitors", ACS Nano, vol. 4, No. 10, Oct. 2010, pp. 5835-5842.

Xu et al., "Asymmetric Activated Carbon—Manganese Dioxide Capacitors in Mild Aqueous Electrolytes Containing Alkaline-Earth Cations", Journal of the Electrochemical Society, vol. 156, Issue 6, 2009, pp. A435-A441.

Yu et al., "Solution-Processed Graphene/$MnO_2$ Nanostructured Textiles for High-Performance Electrochemical Capacitors", Nano Letters, vol. 11, No. 7, Jul. 2011, pp. 2905-2911.

Yuan et al., "Synthesis of Flexible and Porous Cobalt Hydroxide/ Conductive Cotton Textile Sheet and its Application in Electrochemical Capacitors", Electrochimica Acta, vol. 56, Issue 19, Jul. 2011, pp. 6683-6687.

Zhang et al., "Carbon-Based Materials as Supercapacitor Electrodes", Chemical Society Reviews, vol. 38, Issue 9, 2009, pp. 2520-2531.

Zhu et al., "Polypyrrole Metacomposites with Difference Carbon Nanostructures", Journal of Materials Chemistry, vol. 22, Issue 11, 2012, pp. 4996-5005.

* cited by examiner

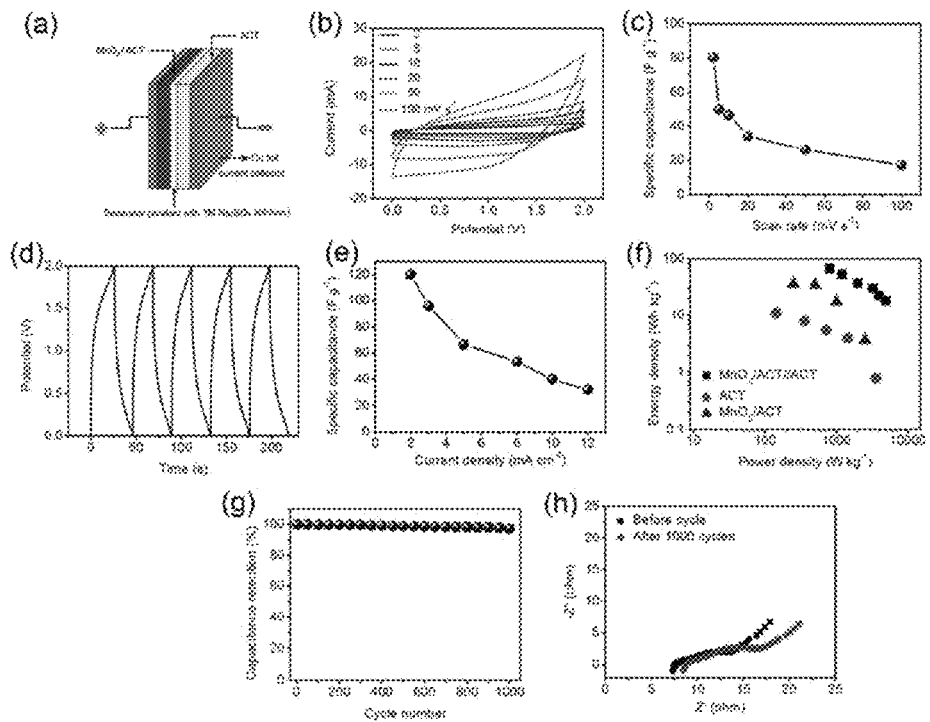

FIG. 5. (a) Schematic of the assembled architecture of asymmetric supercapacitor with $MnO_2$/ACT as positive electrode and ACT as negative electrode, respectively. (b) CV curves of the asymmetric supercapacitor at different scan rates with a potential window of 2 V in 1 M $Na_2SO_4$ aquesous electrolyte. (c) Specific capacitances of the asymmetric supercapacitor at different scan rates. (d) GV constant-current charge/discharge curves of the asymmetric supercapacitor at a current density of 1 A g$^{-1}$. (e) Specific capacitances of the asymmetric supercapacitor at different current densities. (f) Ragone plots of the $MnO_2$/ACT electrode, ACT electrode, and as-assembled $MnO_2$/ACT//ACT asymmetric supercapacitor. (g) Charge/discharge cycle performance of the $MnO_2$/ACT//ACT asymmetric supercapacitor with a potential window of 2 V at a current density of 1 A g$^{-1}$. (h) Comparative Nyquist plots of electrochemical impedance spectra of $MnO_2$/ACT//ACT asymmetric supercapacitor in the frequency range of 100 kHz to 1 Hz before and after cycle tests.

ENERGY STORAGE FROM CELLULOSE FIBER MATERIALS

PRIORITY INFORMATION

The present application claims priority to U.S. Provisional Patent Application Ser. No. 61/687,167 titled "Energy Storage from Cotton Textiles" filed on Apr. 19, 2012, the disclosure of which is incorporated by reference herein.

GOVERNMENT SUPPORT CLAUSE

This invention was made with government support under W911NF-08-0299 awarded by U.S. Army Research Office and under CMMI-0653651 and CMMI 0968843 awarded by the National Science Foundation. The government has certain rights in the invention.

BACKGROUND

Cellulose fibers are fibers from some plant or plant-based materials. Cotton, consisting mainly of cellulose fibers, is the most widely used natural fiber for producing soft and breathable textiles and clothing. Emerging research on cotton fabrics with versatile functionalities revolutionize the use of cotton fabrics as a wearable platform for tremendous applications. Moreover, recently demonstrated prototypes of textile supercapacitors and fiber supercapacitors boost textile-based energy storage applications. Such supercapacitors were constructed either by coating the textiles with functional thin film layers or by modifying the fibers with chemicals. However, direct conversion of cotton textiles into electrically active textiles for constructing supercapacitors remains a great challenge. Enabling textile energy storage requires that the textiles have good electrical conductivity. A well established method is polymer coating, in which individual fibers are uniformly coated with a smooth and coherent layer of conductive polymers. The drawback of this method is that the obtained conductive fabrics show aged decay of electrochemical stability. Recently, a solution-based technique has been developed to convert cotton textiles into conductive textiles by conformally coating the cellulose fibers with carbon nanotubes (CNTs) or graphene thin films. The three-dimensional (3D) high-surface-area characteristic of such textiles facilitates the access of electrolytes, enabling high electrochemical performance of textile supercapacitors. However, the employment of organic surfactant for preparing CNT "ink" is not enviromentally benign. The other drawback is that the use of CNTs increases the cost of the device, which more or less deters their technological applications.

Therefore, a need exists for improved methods and materials for textile energy storage.

SUMMARY

Objects and advantages of the invention will be set forth in part in the following description, or may be obvious from the description, or may be learned through practice of the invention.

In accordance with certain aspects of the present disclosure an asymmetric supercapacitor is described. The supercapacitor includes a first electrode, a second electrode, a thin film separator, and an electrolyte. The first electrode comprises functionalized cellulose fiber and the second electrode comprises functionalized cellulose fiber and metal oxide.

In particular aspects of the present disclosure, the first electrode or second electrode functionalized cellulose fiber can be functionalized by chemical activation. The metal oxide can include manganese oxide, such as nanostructured manganese oxide. The manganese oxide can be coated on the cellulose fiber. The first electrode or second electrode functionalized cellulose fiber can form at least part of a cotton substrate.

In accordance with certain aspects of the present disclosure, a method of making an asymmetric supercapacitor is described. The method includes assembling together a first electrode, a second electrode, a thin film separator, and an electrolyte. The first electrode includes functionalized cellulose fiber and the second electrode includes functionalized cellulose fiber and metal oxide.

In particular aspects of the present disclosure, cellulose fiber can functionalized by chemical activation. Chemical activation can include combining cellulose fiber with an ionic compound, such as sodium fluoride. The second electrode can be formed by electrochemically depositing the metal oxide onto the cellulose fiber.

Other features and aspects of the present invention are discussed in greater detail below.

BRIEF DESCRIPTION OF THE DRAWINGS

A full and enabling disclosure of the present invention, including the best mode thereof to one skilled in the art, is set forth more particularly in the remainder of the specification, which includes reference to the accompanying figures, in which:

FIG. 5 illustrates (a) Schematic of the assembled architecture of asymmetric supercapacitor with MnO$_2$/ACT as positive electrode and ACT as negative electrode, respectively, (b) CV curves of the asymmetric supercapacitor at different scan rates with a potential window of 2 V in 1 M Na$_2$SO$_4$ aqueous electrolyte, (c) Specific capacitances of the asymmetric supercapacitor at different scan rates, (d) GV constant-current charge/discharge curves of the asymmetric supercapacitor at a current density of 1 A g$^{-1}$, (e) Specific capacitances of the asymmetric supercapacitor at different current densities, (f) Ragone plots of the MnO$_2$/ACT electrode, ACT electrode, and as-assembled MnO$_2$/ACT//ACT asymmetric supercapacitor, (g) Charge/discharge cycle performance of the MnO$_2$/ACT//ACT asymmetric supercapacitor with a potential window of 2 V at a current density of 1 A g$^{-1}$, and (h) Comparative Nyquist plots of electrochemical impedance spectra of MnO$_2$/ACT//ACT asymmetric supercapacitor in the frequency range of 100 kHz to 1 Hz before and after cycle tests, in accordance with certain exemplary aspects of the present disclosure.

DETAILED DESCRIPTION OF INVENTION

The following description and other modifications and variations to the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the following description is by way of example only, and is not intended to limit the invention.

The present disclosure is generally directed to an asymmetric supercapacitor. The assymetric supercapacitor includes functionalized cellulose fiber. Metal oxide can be deposited on such functionalized cellulose fibers to form electrodes having enhanced electrochemical performance. In this regard, cellulose fiber can refer to any suitable cellulose fiber and/or any suitable natural as would be known in the art, including but not limited to cotton, linen, bamboo, or the like.

In certain aspects of the present disclosure, cotton textiles were converted into activated carbon textiles (ACTs) for energy storage applications. After such functionalization, the textile features were well reserved and the obtained ACTs were highly conductive and flexible, enabling an ideal electric double layer capacitor (EDLC) performance. The constructed MnO$_2$/ACT hybrid composite by integrating pseudocapacitive MnO$_2$ into the ACTs showed a remarkably enhanced electrochemical performance.

In certain implementations, asymmetric supercapacitors were assembled with the ACTs as the negative electrode and the hybrid MnO$_2$/ACT composite as the positive electrode. The textile-based asymmetric supercapacitors exhibited superior electrochemical characteristics. The present disclosure describes a new method for the functionalization of textiles as supercapacitor building blocks and provides a low-cost and green solution for textile-based energy-storage devices.

In one exemplary embodiment, highly conductive and flexible activated carbon textiles (ACTs) were fabricated by direct conversion of cotton T-shirt textiles through a traditional dipping, drying and curing process, which involved dipping cotton textiles with 1 M NaF solution, drying the pre-treated textiles at 120° C. for 3 h in a pre-heated oven, and annealing the dried textiles in a horizontal tube furnace at 800-1000° C. for 1 h under vacuum and inert atmosphere conditions. However, any suitable textile material can be utilized in connection with the present disclosure.

Figure 1:
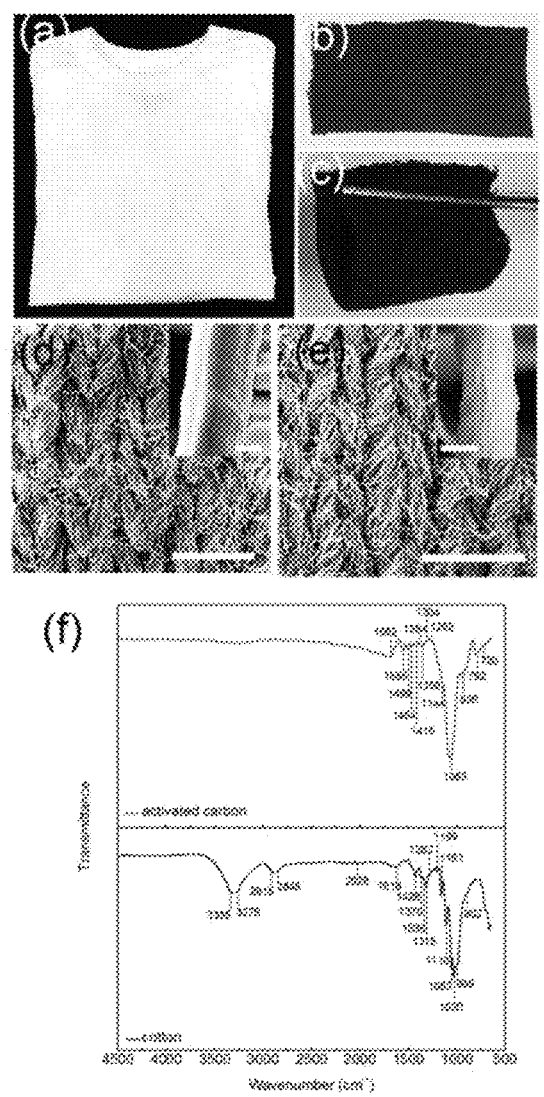
FIG. 1. illustrates an optical photograph of (a) a commercial cotton T-shirt (b) a piece of activated carbon textile (ACT) and (c) a piece of ACT under folding condition, showing its highly flexible nature, and (d) and (e) SEM images of cotton T-shirt textile and ACT, and insets are SEM images of individual cellulose fiber and activated carbon fiber, respectively, and (f) FT-IR spectra of cotton textile and ACT, showing the conversion of cellulose fibers into activated carbon fibers. Scale bars, 1 mm (d); 2 µm (inset of (d)); 1 mm (e) and 5 µm (inset of (e)), in accordance with certain exemplary aspects of the present disclosure.

FIG. 1 shows the functionalization of cotton T-shirt textiles into activated carbon textiles (ACTs). A photograph of a commercial cotton T-shirt is shown in FIG. 1a. Scanning electron microscopy (SEM) characterization of the cotton textile reveals that the textile consists of interwoven cellulose fibers with diameters ranging from 5 to 10 µm (FIG. 1d). FIG. 1b shows a piece of ACT. The ACT is mechanically flexible even under folding condition (FIG. 1c) and highly conductive (sheet resistance ~10-20 Ωsq$^{-1}$). SEM images of the ACT (FIG. 1e) show that the textile feature is well reserved and the diameters of the ACT fibers are comparable to those of cellulose fibers in the cotton textile (inset of FIG. 1d). Fourier transform infrared (FTIR) analysis was performed to validate the functionalization of cellulose fibers into activated carbon fibers, as shown in FIG. 1f. In the FTIR spectrum of cotton textile, the broad adsorption bands at 3335 and 3276 cm$^{-1}$ are attributed to ν(O—H) stretching mode of hydrogen-bonded hydroxyl group, while the bands at 2915 and 2848 cm$^{-1}$ can be assigned to symmetric and asymmetric stretching mode of ν(C—H) in alkane groups, respectively. The band at 2028 cm$^{-1}$ is ascribed to ν(C≡C) stretching in alkyne groups, and the band located at 1619 cm$^{-1}$ comes from ν(C═C) vibrations in alkene groups. A series of adsorption bands at 1428, 1370, 1336 and 1315 cm$^{-1}$ are attributed to ν(C—O) stretching in carboxylic groups. The bands at 1282, 1199, and 1161 cm$^{-1}$ are ascribed to ν(C—O) vibrations in ester, ether or phenol groups, while the bands at 1110, 1053, and 1030 cm$^{-1}$ are assigned to ν(C—O) vibrations in alcohol (R—OH) groups. The bands at 999 and 902 cm$^{-1}$ are due to ν(C—H) stretching in alkene groups. Compared with the spectrum of cotton textiles, the distinct adsorption characteristics of ACT lie in the absence of adsorption bands for hydrogen-bonded hydroxyl groups in frequency range of 3200-3600 cm$^{-1}$ and alkane groups in frequency range of 2850-3000 cm$^{-1}$, and formation of adsorption bands for ν(C═C) aromatic stretching vibrations (1555, 1499, 1464 and 1415 cm$^{-1}$)[17] and γ(C—H) out-of plane bending vibrations (720 and 792 cm$^{-1}$) in benzene derivatives, indicating dehydration process and aromatic carbonization of cotton textiles in activation. Other adsorption bands of the FT-IR spectrum of ACT similar to those of cotton textile are assigned as follows: The band at 1682 cm$^{-1}$ is attributed to v(C=O) vibrations in carbonyl groups, while a series of adsorption bands at 1384, 1358, and 1304 cm$^{-1}$ result from v(C—O) vibrations in carboxylic groups. The band at 1262 cm$^{-1}$ is due to v(C—O) vibrations in ester, ether or phenol groups. The bands at 1144 and 1063 cm$^{-1}$ are ascribed to v(C—O) vibrations in alcohol (R—OH) groups, and the band at 936 cm$^{-1}$ comes from v(C—H) vibrations in alkene groups. The concurrence of aromatic structure in ACT is attributed to its continuous regeneration as consumption of intermediate matter proceeded by gasification of cellulose fibers, during which solid char consisting of element carbon was formed and simultaneously the char was activated with porous surface (FIG. 1e) by preloaded NaF.

Figure 2:
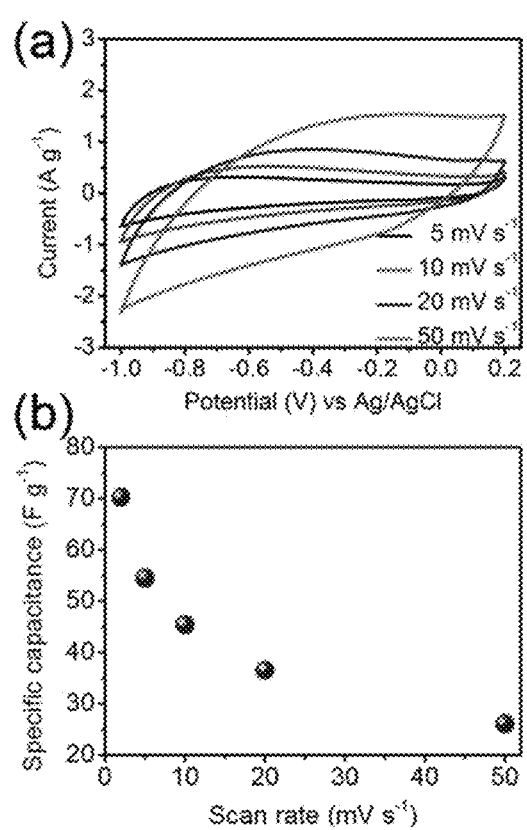
FIG. 2 illustrates (a) Cyclic voltammetry (CV) curves of ACT at different scan rates in 1 M aqueous $Na_2SO_4$ solution, and (b) Specific capacitances at different scan rates of ACT derived from CV curves, in accordance with certain exemplary aspects of the present disclosure.

Cyclic voltammetry (CV) characterization of the ACT as the supercapacitor electrode is shown in FIG. 2. The ACT shows stable electrochemical performance at the potential window ranging from −1.0 to 0 V vs Ag/AgCl in 1 M Na$_2$SO$_4$ aqueous solution. The quasi-rectangular shape of cyclic voltammetry (CV) curves (FIG. 2a) indicates the ideal electrical double layer capacitive behavior. The calculated specific capacitances (See Eq. (1)) from CV are shown in FIG. 2b. The ACT electrode can achieve specific capacitances of 70.2, 54.5, 45.4, 36.5, 26.1 F g$^{-1}$ at scan rates of 2, 5, 10, 20, 50 mV s$^{-1}$, respectively, which is comparable to that of solution-processed textiles. The decay of specific capacitance with increasing scan rate is due to that at low scan rates, the current accumulating process was slow, which enabled full access of active pores/sites on the electrode, thereby resulting in high specific capacitances. It was found that 48% of the capacitance could be achieved when the scan rate was increased by a factor of 10 (5 mV s$^{-1}$ to 50 mV s$^{-1}$), showing a good rate capability of the ACT electrode (FIG. 2b). These features highlight the successful functionalization of cotton textile as supercapacitor electrode. Again, however, the present disclosure is applicable to a variety of cellulose materials.

Figure 3:
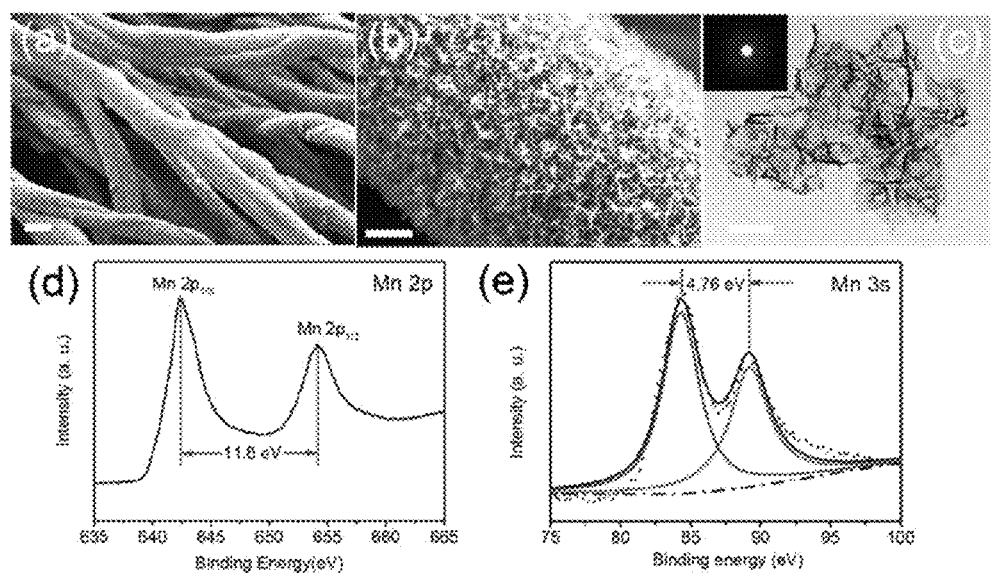
FIG. 3 illustrates (a) SEM image of $MnO_2$/ACT hybrid composite fabricated by electrochemical deposition $MnO_2$ for 120 min using ACT as supporting substrate, showing that all the ACT fibers are coated uniformly coated by $MnO_2$, (b) SEM image of an individual ACT fiber coated with a thin film of $MnO_2$ nanoflowers, (c) TEM image of the flower-like $MnO_2$ nanostructure and the inset is the corresponding SAED pattern, confirming its amorphous nature., and (d) and (e) Mn 2p and Mn 3s XPS spectra of flower-like $MnO_2$ nanostructure; Scale bars, 10 µm (a); 1 µm (b) and 100 nm (c), respectively, in accordance with certain exemplary aspects of the present disclosure.
Figure 6:
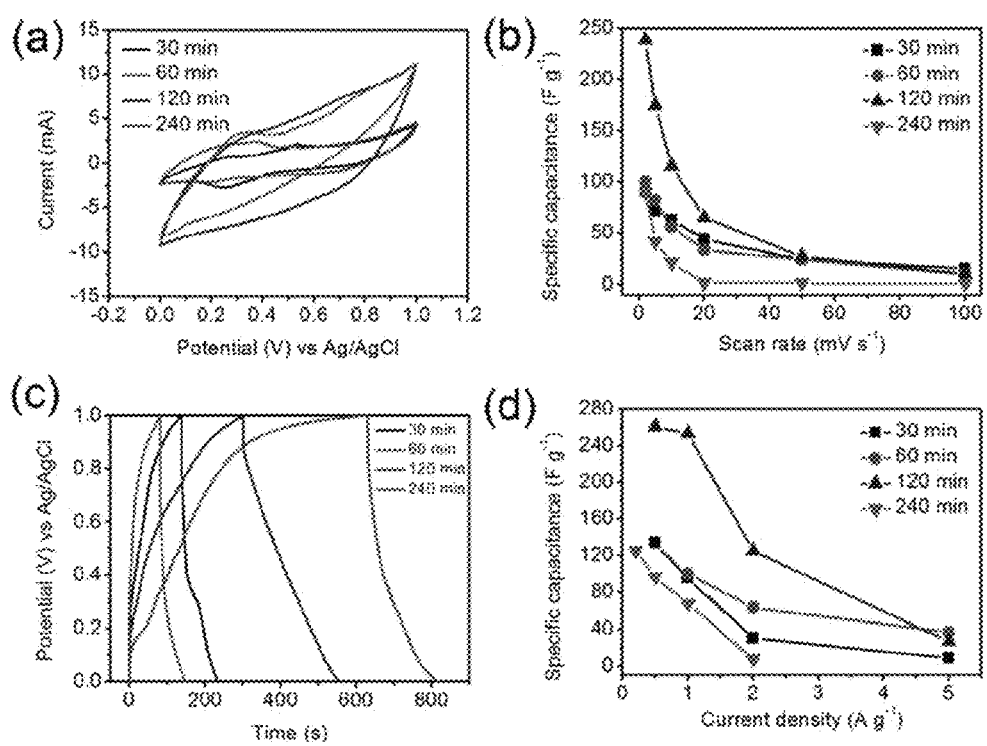
FIG. 6 illustrates a comparison of electrochemical performance of MnO$_2$/ACT composite with different deposition time periods of MnO$_2$ on ACTs in accordance with certain exemplary aspects of the present disclosure; (a) Cyclic voltammetry (CV) curves of MnO$_2$/ACT with different deposition time periods of MnO$_2$ at a scan rate of 10 mV s$^{-1}$ in 1 M Na$_2$SO$_4$ aqueous solution, (b) Specific capacitances of MnO$_2$/ACT with different deposition time periods of MnO$_2$ at different scan rates derived from CV curves, (c) Galvanostatic (GV) constant-current charge/discharge curves of MnO$_2$/ACT with different deposition time periods of MnO$_2$ at a current density of 1 A g$^{-1}$, and (d) Specific capacitances of MnO$_2$/ACT with different deposition time periods of MnO$_2$ at different current densities derived from GV curves.

As described herein, the coupled superior capacitive characteristic and high porosity make the ACTs unique supporting backbones for controlled deposition of nanostructured pseudo-capacitive MnO$_2$ to construct a hybrid composite for enhanced electrochemical performance. In certain aspects of the present disclosure, ACTs were immersed into a mixed solution of Mn(CH$_3$COO)$_2$ and Na$_2$SO$_4$, followed by controlled electrochemical deposition using a three-electrode setup. The mass loading of MnO$_2$ was controlled by adjusting the deposition current and deposition time. It was found that the deposition mass is linearly dependent on the deposition time at an applied current of 1 mA cm$^{-2}$, and an average deposition rate is ~40 μg min$^{-1}$ (see FIG. 6). FIG. 3 shows the structural characterization of MnO$_2$/ACT hybrid composite. A representative SEM image of MnO$_2$/ACT hybrid composite is shown in FIG. 3a, which was fabricated by electrochemical deposition of MnO$_2$ for 120 min using ACTs as supporting substrates. Nanostructured MnO$_2$ was uniformly coated onto the surface of ACT microfibers over almost the entire network of porous ACTs and has a nanoflower-like morphology (FIGS. 3a and 3b), which is consistent with previous studies. Transmission electron microscopy (TEM) characterization on an individual MnO$_2$ nanoflower (FIG. 3c) is consistent with the SEM results and the corresponding selected-area electron diffraction (SAED) pattern indicates that the MnO$_2$ nanoflowers are amorphous. X-ray photoelectron spectroscopy (XPS) characterization was performed to identify the oxidation state and elemental composition of deposited manganese oxide nanostructures. The binding energy peaks of Mn 2p$_{3/2}$ and Mn 2p$_{1/2}$ are centered at 642.2 eV and 654.1 eV in Mn 2p spectrum, respectively (FIG. 3d), which is in good agreement with the previously reported peak binding energy separation (11.8 eV) between Mn 2p$_{3/2}$ and Mn 2p$_{1/2}$. As reported, the average oxidation state of Mn in manganese oxides can be determined by the separation of peak energies (ΔE) of the Mn 3s peaks caused by multiplet splitting, where the ΔE data of MnO, Mn$_3$O$_4$, Mn$_2$O$_3$ and MnO$_2$ are 5.79, 5.50, 5.41 and 4.78 eV, respectively. The as-prepared hybrid textile shows a separated energy of 4.76 eV for the Mn 3s doublet (FIG. 3e), indicating that the coated manganese oxide is MnO$_2$.

Figure 4:
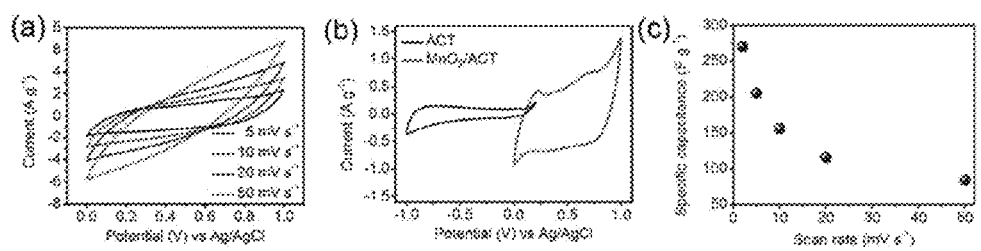
FIG. 4 illustrates (a) Cyclic voltammetry (CV) curves of $MnO_2$/ACT hybrid composite at different scan rates in 1 M aqueous $Na_2SO_4$ solution, (b) Comparative CV curves of ACT and $MnO_2$/ACT hybrid composite at a scan rate of 2 mV $s^{-1}$, and (c) Specific capacitances at different scan rates of $MnO_2$/ACT hybrid composite derived from CV curves, in accordance with certain exemplary aspects of the present disclosure.
Figure 7:
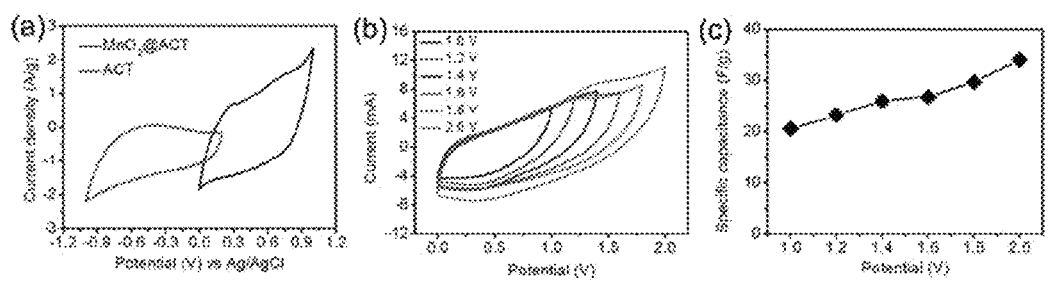
FIG. 7 illustrates (a) Comparative cyclic voltammetry (CV) curves of respective MnO$_2$/ACT and ACT electrodes performed in a three-electrode cell in 1 M Na$_2$SO$_4$ aqueous solution at a scan rate of 20 mV s$^{-1}$, (b) CV curves of an optimized MnO$_2$/ACT//ACT asymmetric supercapacitor measured at different potential windows in 1 M Na$_2$SO$_4$ aqueous solution at a scan rate of 20 mV s$^{-1}$, and (c) Specific capacitances of the asymmetric supercapacitor at increasing potential window derived from CV curves in FIG. 3b, in accordance with certain exemplary aspects of the present disclosure.

CV tests were performed to explore the electrochemical performance of the hybrid MnO$_2$/ACTs composite, as is shown in FIG. 4. The CV curves keep the quasi-rectangular shape at the scan rate up to 20 mV s$^{-1}$ (FIG. 4a). Due to the overpotential on MnO$_2$ and the high surface area of activated carbon at the high voltage limit (1 V), the shapes of CV curves at the scan rate of 50 mV s$^{-1}$ (FIG. 4a) show somewhat distortion from ideal capacitive behavior. The specific capacitances calculated from the CV curves at different scan rates are shown in FIG. 4c, indicating remarkably improved capacitance performance with almost 3 times increase in specific capacitance compared to that of ACTs. At the scan rate of 2 mV s$^{-1}$, the specific capacitance can achieve 269.5 F g$^{-1}$, which exceeds that of CNT/MnO$_2$ cotton textiles and is comparable to that of solution-processed graphene/MnO$_2$ textiles. It was observed that the hybrid composite with 120 min MnO$_2$ deposition achieved the best electrochemical performance (see FIG. 7) compared to other composites with different deposition time periods (30 min, 60 min, 240 min). This is likely due to the fact that for relatively shorter time deposition (30 min and 60 min), the surface of activated carbon fibers was not fully coated with MnO$_2$ thin layers, and for longer time deposition (240 min), the deposited MnO$_2$ layers were too thick for efficient utilization of their capacity. FIG. 4b shows the comparative CV curves of the respective ACT and hybrid MnO$_2$/ACT composite electrodes at a scan rate of 2 mV s$^{-1}$, in which the potential range of ACT was from −1.0 V to 0.2 V while that of MnO$_2$/ACT was from 0.0 V to 1.0 V (both vs Ag/AgCl). The shape of the CV curve of MnO$_2$/ACT is very different from that of ACT because the total capacitance comes from the combined contribution mainly from the redox pseudo-capacitance of MnO$_2$ and partly from the electric double layer capacitance of ACT in the hybrid composite. Both ACT and MnO$_2$/ACT hybrid composite have stable electrochemical performance at their corresponding potential windows, therefore it is expected that the operation voltage can be extended to 2 V in mild aqueous solution if asymmetric supercapacitors were constructed by using MnO$_2$/ACT with positive polarization as positive electrode and ACT with negative polarization as negative electrode, respectively.

FIG. 5 shows the electrochemical characterization of asymmetric supercapacitors which were assembled with MnO$_2$/ACT as the positive electrode and ACT as the negative electrode, respectively, using 1 M Na$_2$SO$_4$ aqueous solution as electrolyte (Schematically shown in FIG. 5a). Both CV and galvanostatic (GV) constant-current charging/discharge tests were used to evaluate the electrochemical performance of the entire device. To avoid unexpected damage of the device under high-voltage level at the early cycling stage, each electrode was polarized at the same potential before cycling the asymmetric supercapacitor. FIG. 5b shows the CV curves of the asymmetric supercapacitor measured at different scan rates of 2, 5, 10, 20, 50, 100 mV $s^{-1}$ with a potential window ranging from 0 to 2 V. These CV curves show ideal capacitive behavior with nearly rectangular shape and retain the rectangular shape without apparent distortion with increasing scan rate up to 100 mV $s^{-1}$, indicating stable and high electrochemical performance of the asymmetric supercapacitor. The specific capacitances at different scan rates calculated from the CV curves (see Eq. (1)) are presented in FIG. 5c. The specific capacitance gradually decreases with increasing scan rate and achieves only 20% capacitance retention when the scan rate reaches 100 mV $s^{-1}$, due to the fact that diffusion limits the movement of cations with time constraint, in which only the most outer surface was utilized for charge storage. FIG. 5d shows the GV curves of the asymmetric supercapacitor at a current density of 1 A $g^{-1}$. These GV curves have a very symmetric nature, indicating a rapid current-voltage response and good electrochemical capacitive behavior. The specific capacitances derived from the discharge curves at different charge/discharge rates (current densities) are shown in FIG. 5e. The specific capacitance of the ACT//$MnO_2$/ACT asymmetric supercapacitor at the current density of 1 mA/$cm^2$ was calculated to be 120 F $g^{-1}$, which exceeds that of graphene/$MnO_2$//AC and AC//$MnO_2$ asymmetric supercapacitors. Energy density and power density are two key factors for evaluating the power applications of supercapacitors. A good supercapacitor is expected to provide high energy density or high specific capacitance at high charge-discharge rates (current densities). FIG. 5f shows the Ragone plots for the $MnO_2$/ACT//ACT asymmetric supercapacitor. The energy density decreases from 66.7 down to 17.8 Wh $kg^{-1}$, while the power density increases from 0.8 up to 4.97 kW $kg^{-1}$ as the current density increases from 1 to 20 mA $cm^{-2}$. Compared to that of individual ACT and $MnO_2$/ACT electrodes, the asymmetric supercapacitor shows remarkably improved energy density and power density (FIG. 5f). These values are much higher than those of conventional supercapacitors in Ragone plot. The maximum energy density of 66.7 Wh $kg^{-1}$ is much higher than that of $MnO_2$-based asymmetric supercapacitors with aqueous solutions as electrolytes, such as $MnO_2$//AC, graphene/$MnO_2$//CNT, and $MnO_2$/graphene//graphene. Another important requirement for supercapacitor applications is cycling capability. The GV cycling tests over 1000 cycles for the $MnO_2$/ACT//ACT asymmetric supercapacitor at a current density of 1 A $g^{-1}$ were carried out. FIG. 5g shows the specific capacitance retention of the $MnO_2$/ACT//ACT asymmetric supercapacitor as a function of charge/discharge cycling numbers with only 2.5% loss in the specific capacitance after 1000 charge-discharge cycles, which is comparable to that of graphene/$MnO_2$//activated carbon fiber (97.3% retention after 1000 cycles) and that of graphene/MnO2//CNT (95% retention after 5000 cycles). Electrochemical impedance spectroscopy (EIS) was carried out for an in-depth understanding of the electrochemical behavior of the asymmteric supercapacitors. FIG. 5h shows the Nyquist plots of the asymmetric supercapacitor before cycling and after 1000 cycles. It is shown that the spectra are similar in terms of the curve shape except that the small change of equivalent series resistance (ESR) at high frequency (100 kHz), which represents a combined resistance of the electrolyte resistance and electrical resistance of textile electrodes. The measured ESRs of the asymmetric supercapacitor before cycling and after 1000 cycles are 7.3 and 8.5Ω, respectively, further demonstrating the excellent electrochemical cycling stability of the asymmetric supercapacitor.

The superior electrochemical performance of the $MnO_2$/ACT//ACT asymmetric supercapacitor can be attributed to the following features of the design: 1) activated carbon (AC) microfibers serve as highly conductive backbones with high surface area for depositing nanostructured $MnO_2$ and provide excellent interfacial contact between $MnO_2$ and ACT microfibers for high accessibility of electrolytic ions; 2) 3D porous microstructure of the ACTs facilitates conformal coating of nanostructured $MnO_2$ and the $MnO_2$ nanoflower architectures shorten the diffusion paths of electrolyte ions during fast charge/discharge process, allowing for high electrochemical utilization of $MnO_2$; 3) The high surface area of ACT negative electrode is favorable for forming electric double layers and facilitates the electrolytic ion transport, providing enhanced energy density and power density. With controlled high-mass loading of $MnO_2$ nanomaterials and optimized mass balance of the electrodes for stable and higher potential windows in ionic liquid electrolyte, further improvement in energy density can be achieved.

In summary, cotton textiles were successfully functionalized into activated carbon textiles (ACTs) by a simple chemical activation route. The ACTs exhibited an ideal electric double layer capacitive behavior and the constructed $MnO_2$/ACT hybrid composite by integrating nanostructured $MnO_2$ into ACTs remarkably enhanced electrochemical performance. An important component of the present disclosure is the activation of cotton T-shirt textiles into porous, mechanically flexible, and highly conductive ACTs with high electrolytically accessible surface area. These characteristics offer the $MnO_2$/ACT//ACT asymmetric supercapacitor the excellent electrochemical performance, such as high specific capacitance, good charge/discharge stability, long-term cycling life, high energy density, and high power density. These findings demonstrate that such low cost and environmentally friendly textiles can be a low-cost and green solution for textile-based energy-storage devices.

The present disclosure can be better understood with reference to the following examples.

Examples

Activation of Cotton T-Shirt Textile

Activation of cotton T-shirt textile was performed by a simple dipping, drying and annealing process. Firstly, a piece of commercial cotton T-shirt made of woven cellulose fibers was dipped into 1 M NaF solution and kept for 1 h. Then the 'wet' textile was dried in a pre-heated oven at 120° C. for 3 h to remove the water. The annealing of the cotton textile was done in a horizontal tube furnace (diameter: 41 mm, length: 1200 mm). The NaF-treated cotton textile was inserted into the center of the tube furnace and heated at 800-1000° C. for 1 h with 300 sccm (standard cubic centimeter) continuous flow of argon gas. After cooling, the as-activated cotton textile was washed with distilled water to remove the remained NaF and dried in a pre-heated oven at 120° C. for 3 h to remove the water.

Electrochemical Deposition of $MnO_2$ Nanoflowers

Typically, a piece of activated carbon textile (ACT) was cut with size of 1 cm×2 cm and then immersed into the mixed of 0.1 M $Mn(CH_3COO)_2$ (Sigma-Aldrich) and 0.1 M $Na_2SO_4$ (Sigma-Aldrich). Electrochemical deposition of $MnO_2$ nanomaterials was achieved with a three electrode setup, where the conductive ACT was used as the working electrode, platinum foil as the counter electrode, and Ag/AgCl electrode as the reference electrode. A small piece of Cu foil was used to connect the textile and the crocodile clips to avoid potential side reactions during deposition. A constant current 1 mA cm$^{-2}$ was applied for a range of deposition time 30~240 min to conformally coat MnO$_2$ nanostructures on ACT fibers. After electrodeposition, the textiles were taken out and carefully washed with DI water to remove excessive electrolyte, and then dried in a preheated oven at 100° C. for 3 h. The mass of MnO$_2$ nanostructures can be obtained by the weight difference before coating and after drying of the textiles.

Structural Characterization of Nanostructured MnO$_2$

The ACT and/or MnO$_2$/ACT hybrid composite was characterized by scanning electron microscopy (SEM, Zeiss Ultra Plus FESEM), transmission electron microscopy (TEM, Hitachi H8000), Fourier transform infrared (FTIR) analysis (Perkin Elmer Spectrum 100 FTIR spectrometer fitted with a Diamond ATR attachment), and X-ray photoelectron spectroscopy (XPS, Kratos Axis Ultra DLD equipped with a monochromated Al Kα X-ray source and hemispherical analyzer capable of an energy resolution of 0.5 eV).

Electrochemical Characterization

All electrochemical characterization was carried out using a CHI 760D electrochemical workstation (CH Instruments Inc.). For ACT and MnO$_2$/ACT hybrid as supercapacitor electrode, the electrochemical tests were performed with a standard three-electrode set-up, in which Ag/AgCl was used as reference electrode, Pt foil as counter electrode and the synthesized sample as working electrode, respectively. A 1 M Na2SO4 solution served as electrolyte at room temperature. Cyclic voltammetry (CV) was performed at scan rates of 2, 5, 10, 20, 50, and 100 mV s$^{-1}$, respectively. Galvanostatic (GV) charge/discharge curves were obtained at various current densities to evaluate the specific capacitance. Electrochemical impedance spectra (EIS) were measured in the frequency range from 10000 to 1 Hz with 0 V mean voltage and amplitude 5 mV using the same setup as CV and GV tests. Asymmetric supercapacitor was assembled by using as-made MnO$_2$/ACT as the positive electrode, ACT as the negative electrode, copper foil attached to the textiles by silver paste as current collectors, and Whatman filter paper soaked with 1 M Na$_2$SO$_4$ aqueous solution as the separator sandwiched in between two electrodes.

Calculations

1. Specific capacitances derived from cyclic votalmmetry (CV) tests can be calculated from the following equation:

$$C_s = \frac{1}{m\upsilon(V_c - V_a)} \int_{V_a}^{V_c} I(V) dV \quad (1)$$

where C(F g$^{-1}$), m(g), υ(V s$^{-1}$), V$_c$ and V$_a$, and I(A) are the specific capacitance, the mass of the active materials in the electrode, potential scan rate, high and low potential limit of the CV tests, and the instant current on CV curves, respectively.

2. Specific capacitances derived from galvanostatic (GV) tests can be calculated from the following equation:

$$C_s = \frac{It}{mV} \quad (2)$$

where C(F g$^{-1}$), I(A), t(s), m(g) and V are the specific capacitance, the discharge current, the discharge time, the mass of the active materials in electrode, and the potential window, respectively.

3. Energy density (E) and power (P) density derived from GV tests can be calculated from the following equations:

$$E = \frac{1}{2}CV^2 \quad (3)$$

$$P = \frac{E}{t} \quad (4)$$

where E(Wh kg$^{-1}$), C(F g$^{-1}$), V(V), P(W kg$^{-1}$) and t(s) are the energy density, specific capacitance, potential window, power density, and discharge time, respectively.

4. For the constructed asymmetric capacitors, specific capacitances derived from cyclic votalmmetry (CV) tests can be calculated from the equation:

$$C_s = \frac{1}{M\upsilon(V_c - V_a)} \int_{V_a}^{V_c} I(V) dV \quad (5)$$

where C(F/g), M(g), υ(V s$^{-1}$), V$_c$ and V$_a$, and I(A) are the specific capacitance, the total mass of electrode materials, potential scan rate, high and low potential limit of the CV tests, and the instant current on CV curves, respectively. The specific capacitance derived from GV tests was calculated by using the following equation:

$$C_s = \frac{4C}{M} = \frac{4It}{MV} \quad (6)$$

These and other modifications and variations to the present invention may be practiced by those of ordinary skill in the art, without departing from the spirit and scope of the present invention, which is more particularly set forth in the appended claims. In addition, it should be understood the aspects of the various embodiments may be interchanged both in whole or in part. Furthermore, those of ordinary skill in the art will appreciate that the foregoing description is by way of example only, and is not intended to limit the invention so further described in the appended claims.

What is claimed:

1. An asymmetric supercapacitor comprising:
a first electrode, a second electrode, a thin film separator, and an electrolyte, wherein the first electrode comprises functionalized cellulose fiber and the second electrode comprises functionalized cellulose fiber and a coating of nanostructured amorphous metal oxide on the functionalized cellulose fiber, the nanostructured metal oxide having a nanoflower morphology.

2. The supercapacitor of claim 1, wherein the first electrode functionalized cellulose fiber is functionalized by chemical activation.

3. The supercapacitor of claim 1, wherein the second electrode functionalized cellulose fiber is functionalized by chemical activation.

4. The supercapacitor of claim 1, wherein the metal oxide comprises manganese oxide.

5. The supercapacitor of claim 1, wherein the first electrode functionalized cellulose fiber forms at least part of a cotton substrate.

6. The supercapacitor of claim 1, wherein the second electrode functionalized cellulosic fiber forms at least part of a cotton substrate.

7. The supercapacitor of claim 1, wherein the thin film separator comprises cellulosic fiber.

8. The supercapacitor of claim 1, wherein the electrolyte comprises an ionic liquid.

9. The supercapacitor of claim 1, wherein the supercapacitor exhibits an energy density of 66.7 Wh/kg.

10. The supercapacitor of claim 1, wherein the supercapacitor exhibits an energy density decrease of from 66.7 Wh/kg to 17.8 Wh/kg and a power density increase of from 0.8 kW/kg to 4.97 kW/kg as current density increases from 1 mA/cm$^2$ to 20 mA/cm$^2$.

11. The supercapacitor of claim 1, wherein the supercapacitor is configured to exhibit a specific capacitance of 269.5 F/g.

* * * * *